US012276277B2

(12) United States Patent
Sahm

(10) Patent No.: US 12,276,277 B2
(45) Date of Patent: Apr. 15, 2025

(54) FLUID TRANSFER AND DEPRESSURIZATION SYSTEM

(71) Applicant: TPE MIDSTREAM LLC, Tulsa, OK (US)

(72) Inventor: Douglas A. Sahm, Lutz, FL (US)

(73) Assignee: TPE Midstream LLC, Tulsa, OK (US)

( * ) Notice: Subject to any disclaimer, the term of this patent is extended or adjusted under 35 U.S.C. 154(b) by 0 days.

(21) Appl. No.: 18/399,143

(22) Filed: Dec. 28, 2023

(65) Prior Publication Data

US 2024/0125311 A1 Apr. 18, 2024

Related U.S. Application Data

(63) Continuation of application No. 17/349,554, filed on Jun. 16, 2021, now Pat. No. 11,859,612, which is a (Continued)

(51) Int. Cl.

*F04B 9/133* (2006.01)
*F04B 1/02* (2006.01)

(Continued)

(52) U.S. Cl.

CPC ................ *F04B 9/133* (2013.01); *F04B 1/02* (2013.01); *F04B 7/0266* (2013.01);

(Continued)

(58) Field of Classification Search

CPC .......... F04B 9/133; F04B 1/02; F04B 7/0266; F04B 39/122; F04B 39/123; F04B 53/16; F04B 17/03; F04B 25/00; F04B 27/005

See application file for complete search history.

(56) References Cited

U.S. PATENT DOCUMENTS

| | | | |
|---|---|---|---|
| 919,909 | A | 4/1909 | Meech |
| 1,782,975 | A | 11/1930 | Schaer |

(Continued)

FOREIGN PATENT DOCUMENTS

| | | | | |
|---|---|---|---|---|
| EP | 2264288 | A1 | 12/2010 | |
| FR | 2836703 | A1 * | 9/2003 | ............. F04B 9/133 |
| GB | 1503648 | A | 3/1978 | |
| WO | 2017093396 | A1 | 6/2017 | |

OTHER PUBLICATIONS

United States Patent and Trademark Office "Requirement for Restriction" issued in connection with U.S. Appl. No. 16/129,225 on Nov. 30, 2018, 6 pages.

(Continued)

*Primary Examiner* — Nathan C Zollinger

(74) *Attorney, Agent, or Firm* — Hanley, Flight & Zimmerman, LLC

(57) ABSTRACT

A gas transfer and depressurization system that is configured to transfer gas from a first location to a second location wherein during the transfer of gas the pressure of the first location is reduced. The gas transfer and depressurization system includes a drive chamber having an interior volume with a drive assembly movably disposed therein. A first cylinder and a second cylinder are operably coupled to the drive chamber on opposing sides thereof. The drive assembly includes a drive rod having portions extending into the first cylinder and second cylinder wherein the drive rod has pistons formed on opposing ends thereof. A controller is operably coupled to a compressed air source and is configured to provide compressed air into said drive chamber so as to reciprocally move the drive assembly. Gas blocks and coupling block are additionally present and facilitate flow of gas intermediate the first and second cylinders.

20 Claims, 7 Drawing Sheets

Related U.S. Application Data continuation of application No. 16/549,729, filed on Aug. 23, 2019, now Pat. No. 11,111,907, which is a continuation of application No. 16/129,225, filed on Sep. 12, 2018, now Pat. No. 10,443,586.

(60) Provisional application No. 62/670,810, filed on May 13, 2018.

(51) Int. Cl.

| | |
|---|---|
| ***F04B 7/02*** | (2006.01) |
| ***F04B 17/03*** | (2006.01) |
| ***F04B 25/00*** | (2006.01) |
| ***F04B 27/00*** | (2006.01) |
| ***F04B 39/12*** | (2006.01) |
| ***F04B 53/16*** | (2006.01) |
| *F17D 3/10* | (2006.01) |
| *F17D 5/02* | (2006.01) |

(52) U.S. Cl.

CPC .......... *F04B 39/122* (2013.01); *F04B 39/123* (2013.01); *F04B 53/16* (2013.01); *F04B 17/03* (2013.01); *F04B 25/00* (2013.01); *F04B 27/005* (2013.01); *F17D 3/10* (2013.01); *F17D 5/02* (2013.01)

(56) References Cited

U.S. PATENT DOCUMENTS

| | | | | | |
|---|---|---|---|---|---|
| 1,870,848 | A | | 8/1932 | Hewitt | |
| 2,072,314 | A | | 3/1937 | Rhodes | |
| 2,887,293 | A | | 5/1959 | Gasche | |
| 3,162,357 | A | * | 12/1964 | Burion | F04B 35/00 417/364 |
| 3,272,894 | A | | 9/1966 | Roach | |
| 3,282,167 | A | | 11/1966 | McKenzie | |
| 3,489,100 | A | | 1/1970 | Hill | |
| 3,540,349 | A | | 11/1970 | Joseph | |
| 3,591,240 | A | | 7/1971 | Seymour | |
| 3,612,479 | A | | 10/1971 | Smith, Jr. | |
| 3,626,576 | A | | 12/1971 | Ray | |
| 3,665,966 | A | | 5/1972 | Ver Nooy | |
| 3,746,027 | A | | 7/1973 | Elliott | |
| 3,746,047 | A | | 7/1973 | Peters | |
| 3,776,665 | A | | 12/1973 | Dalton | |
| 3,867,964 | A | | 2/1975 | Gardner | |
| 3,905,729 | A | | 9/1975 | Bauer | |
| 3,963,383 | A | | 6/1976 | Hill | |
| 4,026,329 | A | | 5/1977 | Thompson | |
| 4,144,908 | A | | 3/1979 | Dunn | |
| 4,350,266 | A | | 9/1982 | Hetherington | |
| 4,351,349 | A | | 9/1982 | Minotti | |
| 4,377,945 | A | | 3/1983 | Di Giovanni | |
| 4,382,750 | A | | 5/1983 | Robertson | |
| 4,390,322 | A | | 6/1983 | Budzich | |
| 4,405,292 | A | | 9/1983 | Bixby, Jr. | |
| 4,413,655 | A | | 11/1983 | Brown | |
| 4,441,862 | A | | 4/1984 | Vogel | |
| 4,457,326 | A | | 7/1984 | Donnelly | |
| 4,478,556 | A | | 10/1984 | Gozzi | |
| 4,497,332 | A | | 2/1985 | Sewell | |
| 4,529,365 | A | * | 7/1985 | Schutt | F04B 39/066 417/372 |
| 4,653,986 | A | | 3/1987 | Ashton | |
| 4,677,827 | A | | 7/1987 | Shenoy | |
| 4,730,991 | A | | 3/1988 | Handfield | |
| 4,761,118 | A | | 8/1988 | Zanarini | |
| 5,062,207 | A | | 11/1991 | Martin | |
| 5,094,596 | A | * | 3/1992 | Erwin | F04B 9/113 417/397 |
| 5,273,405 | A | | 12/1993 | Chalmers | |
| 5,324,175 | A | * | 6/1994 | Sorensen | F04B 9/1295 417/397 |
| 5,399,073 | A | | 3/1995 | Bauer | |
| 5,577,528 | A | | 11/1996 | Saha | |
| 5,778,919 | A | | 7/1998 | Petrone | |
| 5,836,186 | A | | 11/1998 | Winner, Jr. | |
| 5,863,186 | A | * | 1/1999 | Green | F04B 9/113 417/244 |
| 5,967,191 | A | | 10/1999 | Mummolo | |
| 5,975,122 | A | | 11/1999 | Hazen | |
| 6,261,070 | B1 | | 7/2001 | Johnson | |
| 6,283,153 | B1 | | 9/2001 | Brisco | |
| 6,612,330 | B1 | | 9/2003 | Robison | |
| 6,652,241 | B1 | | 11/2003 | Alder | |
| 6,841,007 | B1 | | 1/2005 | Howard | |
| 6,899,138 | B2 | | 5/2005 | Lundman | |
| 7,021,328 | B2 | | 4/2006 | Robison | |
| 7,281,565 | B2 | | 10/2007 | Carmen, Jr. | |
| 7,296,587 | B2 | | 11/2007 | Gill | |
| 7,311,114 | B2 | | 12/2007 | Morrison | |
| 7,500,834 | B2 | | 3/2009 | Durward | |
| 8,001,988 | B2 | | 8/2011 | Wilson | |
| 8,028,535 | B2 | | 10/2011 | Sikora | |
| 8,147,218 | B2 | | 4/2012 | Thrasher | |
| 8,186,972 | B1 | | 5/2012 | Glauber | |
| 8,197,611 | B2 | | 6/2012 | Strohmeier | |
| 8,220,479 | B1 | | 7/2012 | Mayeaux | |
| 8,299,734 | B2 | | 10/2012 | Mullet | |
| 8,368,328 | B2 | | 2/2013 | Mullet | |
| 8,548,756 | B1 | | 10/2013 | Foley | |
| 8,791,658 | B2 | | 7/2014 | Mullet | |
| 8,947,027 | B2 | | 2/2015 | Mullet | |
| 9,018,868 | B2 | | 4/2015 | Lucas | |
| 9,073,556 | B2 | | 7/2015 | Foege | |
| 9,115,821 | B2 | | 8/2015 | Bauer | |
| 9,152,032 | B2 | | 10/2015 | Mullet | |
| 9,194,179 | B2 | | 11/2015 | Mullet | |
| 9,403,105 | B2 | | 8/2016 | Felisari | |
| 9,714,852 | B2 | | 7/2017 | Moore | |
| 9,739,271 | B2 | | 8/2017 | Chang | |
| 9,777,959 | B2 | | 10/2017 | Bonnissel | |
| 9,816,497 | B2 | | 11/2017 | Strickland | |
| 9,890,585 | B2 | | 2/2018 | Mullet | |
| 9,976,686 | B2 | | 5/2018 | Sander | |
| 10,018,303 | B1 | | 7/2018 | Won | |
| 10,139,259 | B2 | | 11/2018 | Chen | |
| 10,247,338 | B2 | | 4/2019 | Bryngelson | |
| 10,247,643 | B1 | | 4/2019 | Johnsen | |
| 10,330,238 | B2 | | 6/2019 | Theener | |
| 10,443,586 | B1 | * | 10/2019 | Sahm | F04B 27/005 |
| 10,465,833 | B2 | | 11/2019 | Huffman | |
| 10,533,694 | B1 | | 1/2020 | Vanderlans | |
| 11,111,907 | B1 | * | 9/2021 | Sahm | F04B 35/008 |
| 11,859,612 | B2 | * | 1/2024 | Sahm | F04B 49/08 |
| 2003/0172661 | A1 | | 9/2003 | Yaroslavovich | |
| 2007/0095400 | A1 | | 5/2007 | Bergquist | |
| 2007/0284011 | A1 | | 12/2007 | Freyer | |
| 2011/0236224 | A1 | | 9/2011 | Glauber | |
| 2017/0254717 | A1 | | 9/2017 | Mcneil | |
| 2017/0314549 | A1 | | 11/2017 | Chang | |
| 2017/0335840 | A1 | | 11/2017 | Hausle | |
| 2018/0231184 | A1 | | 8/2018 | Won | |
| 2018/0356044 | A1 | | 12/2018 | Monti | |
| 2019/0195213 | A1 | | 6/2019 | Burrows | |
| 2019/0219211 | A1 | | 7/2019 | Kraige | |
| 2019/0257306 | A1 | | 8/2019 | Blundell et al. | |
| 2019/0257464 | A1 | | 8/2019 | Czaplewski | |
| 2019/0338858 | A1 | | 11/2019 | Mainzer | |
| 2020/0003246 | A1 | | 1/2020 | Kaveney | |
| 2020/0018435 | A1 | | 1/2020 | Huffman | |

OTHER PUBLICATIONS

United States Patent and Trademark Office, "Non-Final Office Action", issued in connection with U.S. Appl. No. 16/129,225 dated Mar. 7, 2019, 7 pages.

United States Patent and Trademark Office, "Notice of Allowance" issued in U.S. Appl. No. 16/129,225 on Jun. 19, 2019, 11 pages.

United States Patent and Trademark Office, "Non-Final Action" issued in U.S. Appl. No. 16/549,729 on Mar. 25, 2020, 16 pages.

(56) References Cited

OTHER PUBLICATIONS

United States Patent and Trademark Office "Final Office Action", issued in connection with U.S. Appl. No. 16/549,729 on Sep. 21, 2020, 19 pages.
United States Patent and Trademark Office "Notice of Allowance and Fee(s) Due" issued in connection with U.S. Appl. No. 16/549,729 on Jan. 27, 2021, 9 pages.
United States Patent and Trademark Office, "Notice of Allowance" issued in U.S. Appl. No. 17/349,554 on Aug. 17, 2023, 12 pages.
United States Patent and Trademark Office, "Non-Final Office Action", issued in connection with U.S. Appl. No. 17/349,554 on Feb. 9, 2023, 16 pages.

* cited by examiner

FLUID TRANSFER AND DEPRESSURIZATION SYSTEM

RELATED APPLICATIONS

This patent arises from a continuation of U.S. application Ser. No. 17/349,554 (now U.S. Pat. No. 11,859,612), titled "Fluid Transfer and Depressurization System," filed Jun. 16, 2021, which is a continuation of U.S. application Ser. No. 16/549,729 (now U.S. Pat. No. 11,111,907), titled "Fluid Transfer and Depressurization System," filed Aug. 23, 2019, which is a continuation of U.S. application Ser. No. 16/129,225 (now U.S. Pat. No. 10,443,586), titled "Fluid Transfer and Depressurization System," filed Sep. 12, 2018, which claims priority to U.S. Provisional Application No. 62/670,810, titled "Fluid Transfer and Depressurization Apparatus," filed May 13, 2018. U.S. application Ser. No. 17/349,554; U.S. application Ser. No. 16/549,729; U.S. application Ser. No. 16/129,225; and U.S. Provisional Application No. 62/670,810 are hereby incorporated by this reference in their entireties.

FIELD OF THE INVENTION

The present invention relates generally to pipeline and vessel fluid transfer, more specifically but not by way of limitation, a pipeline and vessel fluid transfer apparatus that is configured to facilitate fluid transfer from a pipeline or vessel to another pipeline portion or vessel wherein during the fluid/gas transfer no emission of the fluid occurs into the atmosphere.

BACKGROUND

The United States has the largest network of energy pipelines in the world with approximately two and a half million miles of pipelines distributed across the continent. This network of pipelines is utilized to transport materials such as but not limited to crude oil and natural gas. The material disposed within the pipes is moved therethrough utilizing pumping stations so as to distribute to locations such as but not limited to ports and other facilities. Oil pipelines are typically manufactured from steel and/or plastic wherein natural gas pipelines are manufactured from carbon steel and are constructed to accommodate the pressurization of the natural gas or other similar gaseous fuels. Pipeline conveying flammable or explosive material such as but not limited to natural gas present various safety concerns. Routine operation of the pipeline must be carried out under strict safety protocols to prevent accidents such as but not limited to explosions or fires.

Routine pipeline or vessel maintenance is required for pipelines/vessels such as but not limited to natural gas pipelines/vessels. By way of example but not limitation, tasks such as filter replacements, equipment maintenance and pipeline pig launching/receiving require a portion of the pipeline to be emptied of its contents in order to facilitate the performance of the aforementioned activities. Presently, the two most common methods to discharge the contents of a portion of a pipeline are venting and flaring. In the former, the material such as but not limited to natural gas is vented to atmosphere. Flaring involves the release of the material to atmosphere and further igniting so as to burn the material during the release from the pipeline. Both venting and flaring bear significant safety and environmental risks. Less than whole-line depressurizations are performed daily as part of routine pipeline operation and maintenance. The aforementioned common practices of venting and flaring face significant regulatory pressure as the release of gases such as but not limited to methane have been identified as a major source of greenhouse gas. To perform the conventional operations of venting or flaring most states require permitting, which adds to the cost of operations and further requires additional time to acquire the permits.

Accordingly, there is a need for a fluid depressurization and transfer apparatus that is configured to facilitate the transfer of a fluid from a pipeline or vessel to another vessel or portion of a pipeline wherein no emission of the fluid occurs to atmosphere during the transfer process.

SUMMARY OF THE INVENTION

It is the object of the present invention to provide a fluid transfer apparatus configured to provide an emission-free transfer of a fluid from a pipeline or vessel to a suitable location wherein the apparatus utilizes a compressed air source to provide operation thereof.

Another object of the present invention is to provide a fluid transfer and depressurization apparatus configured to depressurize a vessel or a portion of a pipeline and transfer the contents disposed therein to a second location that includes a drive chamber pneumatically coupled to the air source.

A further object of the present invention is to provide a fluid transfer apparatus configured to provide an emission-free transfer of a fluid from a pipeline or vessel to a suitable location that includes a first gas cylinder operably coupled to the drive chamber.

Still another object of the present invention is to provide a fluid transfer and depressurization apparatus configured to depressurize a vessel or a portion of a pipeline and transfer the contents disposed therein to a second location that includes a second gas cylinder wherein the second gas cylinder is operably coupled to the drive chamber opposite the first gas cylinder.

An additional object of the present invention is to provide a fluid transfer apparatus configured to provide an emission-free transfer of a fluid from a pipeline or vessel to a suitable location wherein the drive chamber has disposed therein a drive assembly that further includes a drive block and rod wherein the rod is operably coupled with the first gas cylinder and second gas cylinder.

Yet a further object of the present invention is to provide a fluid transfer and depressurization apparatus configured to depressurize a vessel or a portion of a pipeline and transfer the contents disposed therein to a second location that further includes a first coupling block intermediate the first gas cylinder and the drive chamber configured to provide the operable coupling thereof.

Another object of the present invention is to provide a fluid transfer apparatus configured to provide an emission-free transfer of a fluid from a pipeline or vessel to a suitable location that further includes a second coupling block operably intermediate the drive chamber and the second gas cylinder.

Still an additional object of the present invention is to provide a fluid transfer and depressurization apparatus configured to depressurize a vessel or a portion of a pipeline and transfer the contents disposed therein to a second location that further includes a gas tubing network configured to facilitate the intake of a gas from a first source and provide discharge thereof to a second source.

An alternative object of the present invention is to provide a fluid transfer apparatus configured to provide an emission-free transfer of a fluid from a pipeline or vessel to a suitable location that further includes a pneumatic controller operable coupled to the compressed air source and configured to provide operation of the drive assembly.

An additional object of the present invention is to provide a fluid transfer and depressurization apparatus configured to depressurize a vessel or a portion of a pipeline and transfer the contents disposed therein to a second location that includes at least one gas inlet manifold configured to distribute a gas to either the first and/or the first gas cylinder and second gas cylinder.

Another object of the present invention is to provide a fluid transfer apparatus configured to provide an emission-free transfer of a fluid from a pipeline or vessel to a suitable location that further includes at least one gas discharge manifold operably coupled to either the first gas cylinder and/or the second gas cylinder wherein the at least one gas discharge manifold is configured to initiate the distribution of the gas being transferred to the second location.

Yet a further object of the present invention is to provide a fluid transfer and depressurization apparatus configured to depressurize a vessel or a portion of a pipeline and transfer the contents disposed therein to a second location wherein the gas tubing network further includes elements such as but not limited to purge valves, pressure gauges, cutoff switches and regulators.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
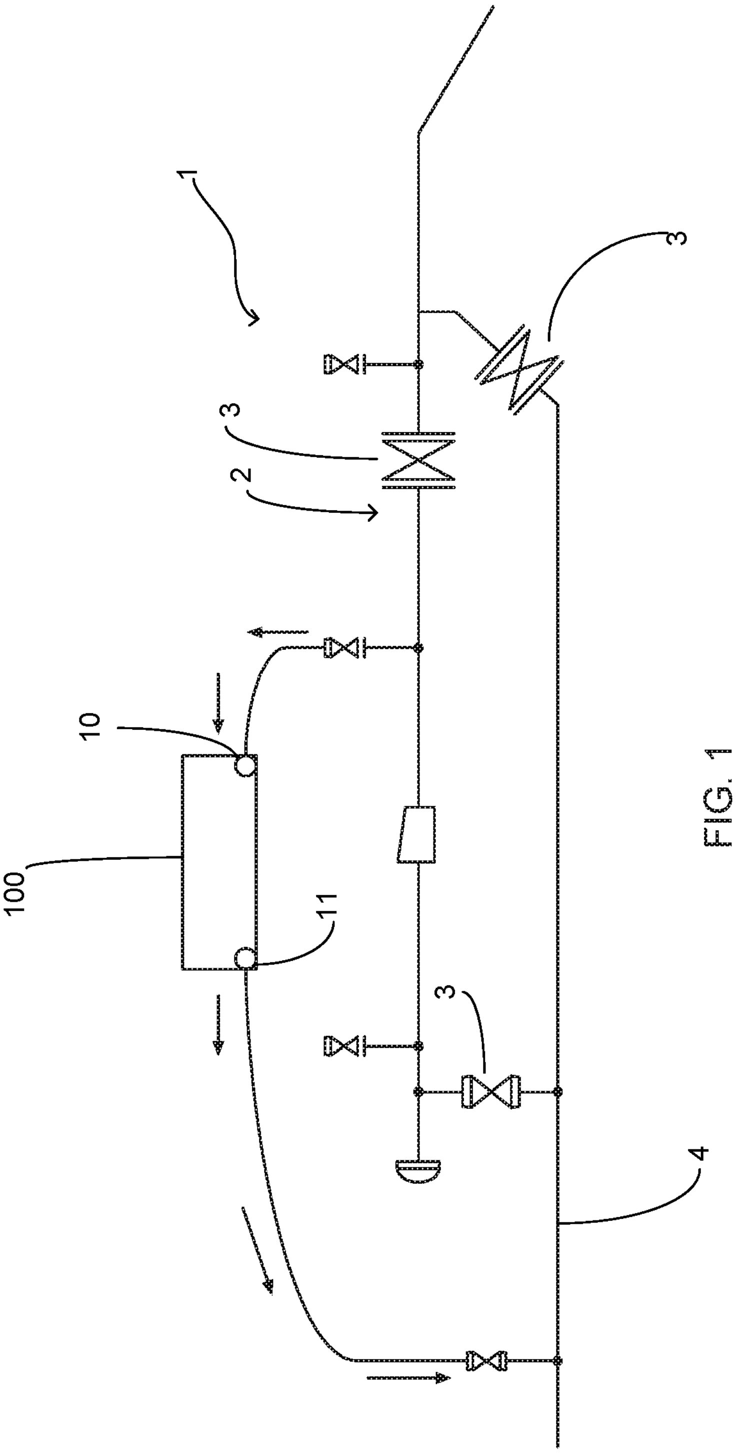
FIG. 1 is a diagrammatic view of a pipeline portion configuration illustrating the placement of the present invention.

Referring now to the drawings submitted herewith, wherein various elements depicted therein are not necessarily drawn to scale and wherein through the views and figures like elements are referenced with identical reference numerals, there is illustrated a fluid transfer and depressurization system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1 herein, a pipeline schematic 1 is illustrated therein so as to demonstrate an exemplary installation of the fluid transfer and depressurization system 100. The fluid transfer and depressurization system 100 is fluidly coupled to a pipeline portion 2 that requires to have the contents therein removed. The pipeline portion 2 is a conventional pipeline portion such as but not limited to a pigging station. The pipeline portion 2 is configured to be isolated utilizing the appropriate valves 3. The fluid transfer and depressurization system 100 is coupled to the pipeline portion 2 at the gas inlet 10 of the fluid transfer and depressurization system 100 utilizing a suitable hose or similar element. The fluid transfer and depressurization system 100 is operably coupled to an adjacent pipeline portion 4 via the gas discharge port 11 utilizing suitable hosing or tubing. As the fluid transfer and depressurization system 100 commences operation the pressurized gas stored in pipeline portion 2 is transferred to the adjacent pipeline portion 4 that is also at a pressure that is greater than that of atmospheric pressure. During operation of the fluid transfer and depressurization system 100 the contents disposed within the pipeline portion 2 are completely evacuated and transferred to adjacent pipeline portion 4. At the termination of the operating cycle of the fluid transfer and depressurization system 100 the pipeline portion 2 has been substantially evacuated of its contents and the pressure therein is at or below atmospheric pressure. Ensuing completion of the evacuation of the contents disposed in the pipeline portion 2, the pipeline portion 2 can be accessed for maintenance or other purposes.

Figure 7:
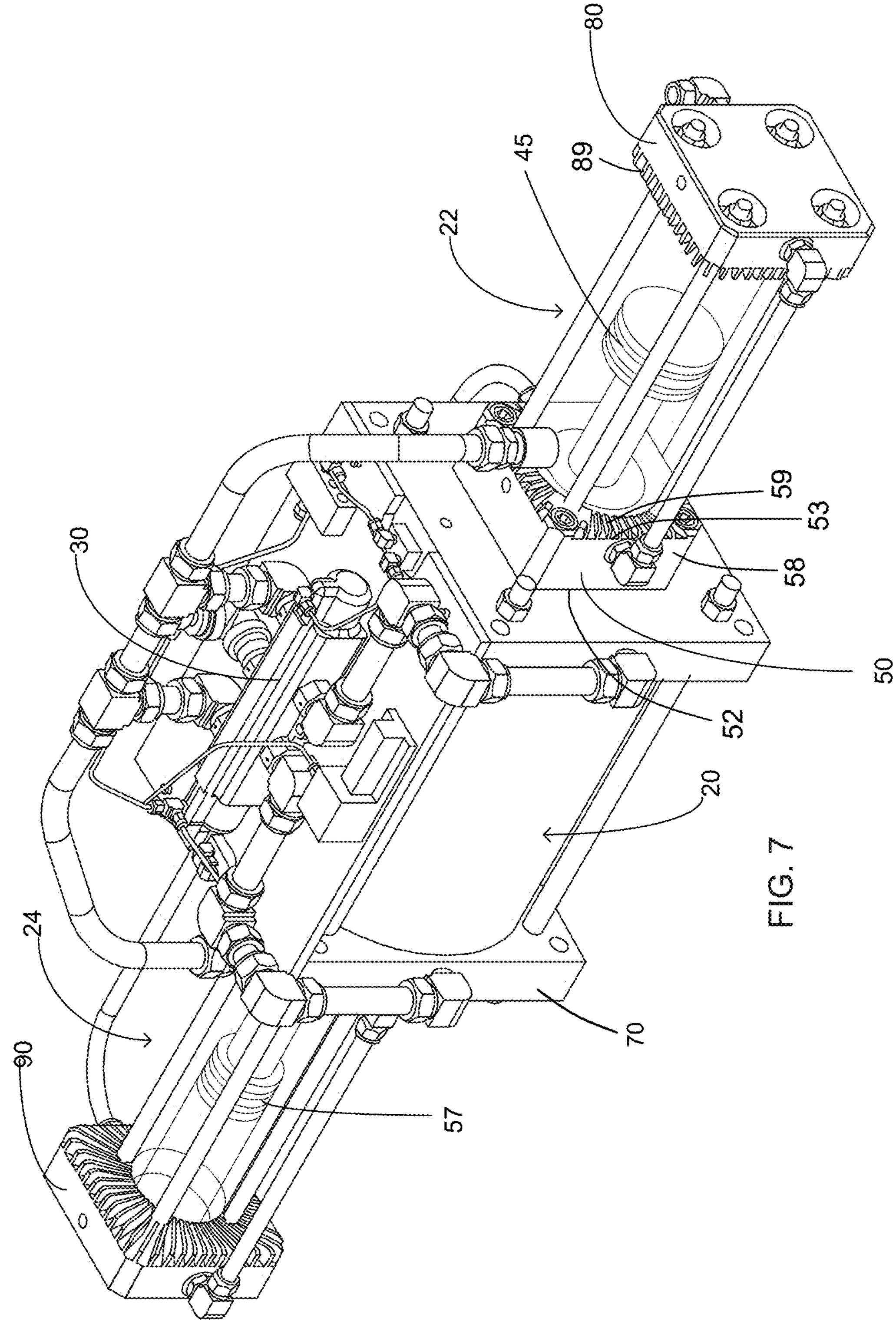
FIG. 7 is a perspective view of the present invention.

The fluid transfer and depressurization system 100 is disposed within a suitable durable housing (not illustrated herein) and as illustrated herein in FIG. 7 includes a drive chamber 20 having a first cylinder 22 operably coupled thereto and a second cylinder 24 operably coupled thereto on the opposing side thereof. The fluid transfer and depressurization system 100 in its preferred embodiment is powered utilizing compressed air which is introduced via the air inlet 26. Air inlet 26 is operably coupled to a conventional compressed air source such as but not limited to a compressor or air tank utilizing conventional elements. The air is directed via tubing 28 to the controller 30. Operably coupled to tubing 28 are conventional elements such as but not limited to a filter 21, regulator 23 and lubricator 25. The immediately aforementioned elements are well known in the art and provide required functionality when utilizing compressed air. The controller 30 is constructed similarly to an air-switching valve and functions to direct air into the interior volume 19 of the drive chamber 20. Controller 30 functions to alternate the flow of air into the drive chamber 20 so as to facilitate the reciprocal movement of the drive assembly 35. The controller 30 is operably coupled to the drive chamber 20 utilizing tubing 39. Tubing 39 is conventional metal tubing and is configured to direct air into the drive chamber so as to facilitate the reciprocal movement of the drive assembly 35.

Drive assembly 35 includes a drive member 38 and rod 40. Drive member 38 is manufactured from a suitable durable material as is movably secured within the interior volume 19 of the drive chamber 20. The drive member 38 is sealably engaged with the inner wall 27 utilizing suitable durable techniques so as to inhibit air from leaking across the drive member 38. Rod 40 includes first portion 41 and second portion 42. First portion 41 extends outward from the first side 48 of the drive member 38 and is perpendicular thereto. First portion 41 extends inward into first cylinder 22. Integrally formed on the end 44 of the first portion 41 is piston 45. Piston 45 is sealably engaged with the first cylinder 22 utilizing suitable durable techniques. As will be further discussed herein, reciprocal movement of the piston 45 will facilitate transfer of gas from the gas inlet 10 to the gas discharge port 11. The first cylinder 22 is constructed of suitable durable material and is manufactured to a desired length and diameter so as to accommodate a preferred amount of fluid therein.

Operably intermediate the first cylinder 22 and the drive chamber 20 is the first coupling block 50. First coupling block 50 is manufactured from a suitable durable material such as but not limited to metal. The first coupling block 50 provides a technique to sealably secure the first cylinder to the drive chamber 20 and additionally provide gas flow into the first cylinder 22. First coupling block 50 includes sealing members 51 configured to provide a sealable connection intermediate first portion 41 of rod 40. An upper passage 54 and a lower passage 56 are formed within the first coupling block 50 utilizing suitable techniques. The upper passage 54 is fluidly coupled to the gas inlet manifold 60 so as to facilitate introduction of gas into the first cylinder 20 therethrough during a movement of the piston 45 wherein the piston 45 is traveling away from the drive chamber 20. The lower passage 56 provides an operably coupling to the gas discharge manifold 65. During a movement of the piston 45 inwards towards the drive chamber 20 gas disposed intermediate the piston 45 and the drive chamber 20 is transferred to gas discharge manifold 65 via lower passage 56.

The fluid transfer and depressurization system 100 includes second cylinder 24 opposedly coupled to the drive chamber 20 relative to the first cylinder 22. The second cylinder 24 is constructed similarly to the first cylinder 22 and is configured to receive and discharge a fluid being transferred by the fluid transfer and depressurization system 100. The second portion 42 of the rod 40 extends into the second cylinder 24 and is sealably engaged therewith. Second portion 42 of the rod 40 has a piston 57 integrally formed on the end thereof distal to the drive member 38. Piston 57 is sealably coupled with second cylinder 24 utilizing suitable durable techniques. Piston 57 is reciprocally movable within the interior volume of second cylinder 24. As drive member 38 alternates direction of travel, piston 57 moves in conjunction therewith and as further discussed herein facilitates fluid transfer from the gas inlet 10 to the gas discharge port 11. Intermediate the drive chamber 20 and the second cylinder 24 is the second coupling block 70. The second coupling block 70 provides a sealable operable coupling of the drive chamber 20 and the second cylinder 24. The second coupling block 70 includes sealing elements 72 surroundably mounted to second portion 42 of the rod 40. Sealing elements 72 provide the necessary hermetic seal and it is contemplated within the scope of the present invention that the sealing elements 72 could be formed from various suitable materials such as but not limited to rubber. The second coupling block 70 further has formed therein an upper passage 75 and a lower passage 76. The upper passage 75 is operably coupled to gas inlet manifold 60 and is configured to facilitate flow of fluid therebetween. The lower passage 76 is operably coupled to the gas discharge manifold 65 and allows the flow of fluid therebetween during a piston 57 movement that is traversing towards the drive chamber 20.

Operably coupled to first cylinder 22 distal to the drive chamber 20 is first gas block 80. The first gas block 80 is hermetically coupled to the first cylinder 22 and is manufactured from a suitable durable material. The first gas block 80 is fluidly coupled to the first cylinder 22 and provides additional passages for transfer of fluid from the gas inlet manifold 60 to the gas discharge manifold 65. First gas block 80 includes first passage 81 and second passage 82 fluidly coupled to the gas inlet manifold 60 and gas discharge manifold 65 respectively. As is further discussed herein, dependent of the direction of movement of the piston 45 fluid is transferred into and/or out of the first cylinder 22 via the first passage 81 and/or second passage 82.

Operably coupled to second cylinder 24 distal to the drive chamber 20 is second gas block 90. The second gas block 90 is hermetically coupled to the second cylinder 24 and is manufactured from a suitable durable material. The second gas block 90 is fluidly coupled to the second cylinder 24 and provides additional passages for transfer of fluid from the gas inlet manifold 60 to the gas discharge manifold 65. Second gas block 90 includes first passage 91 and second passage 92 fluidly coupled to the gas inlet manifold 60 and gas discharge manifold 65 respectively. As is further discussed herein, dependent of the direction of movement of the piston 57 fluid is transferred into and/or out of the second cylinder 24 via the first passage 91 and/or second passage 92.

The reciprocal movement of the drive member 38 is provided by the compressed air and its distribution thereof by the controller 30. The controller 30 will alternate the flow of air through tubes 39 so as to facilitate the reciprocal movement of the drive member 38. By way of example but not limitation, an exemplary movement of the drive member 38 is as follows. The controller 30 will direct air into tube 139 so as to drive air into the drive chamber area 120. The compressed air is introduced at a sufficient pressure into the drive chamber area 120 so as to move the drive member 38 in the direction towards the second cylinder 24. As the drive member 38 traverses towards the second cylinder 24 and becomes proximate thereto, the drive member 38 will engage first switch 110. First switch 110 is operably coupled to controller 30 and upon engagement therewith, the controller 30 will terminate supply of air into tube 139 and alternate supply of compressed air into tube 137. Subsequent the air supply alteration, the drive member 38 will commence traversing through the drive chamber 20 in the alternate direction towards the first cylinder 22. The drive member 38 continues travel towards the first cylinder 22 until engagement of the second switch 111 which will return the airflow to the first step discussed above. The gas transfer from the first cylinder 22 and second cylinder 24 as a result of the drive member 38 movement will be further discussed herein.

Figure 2:
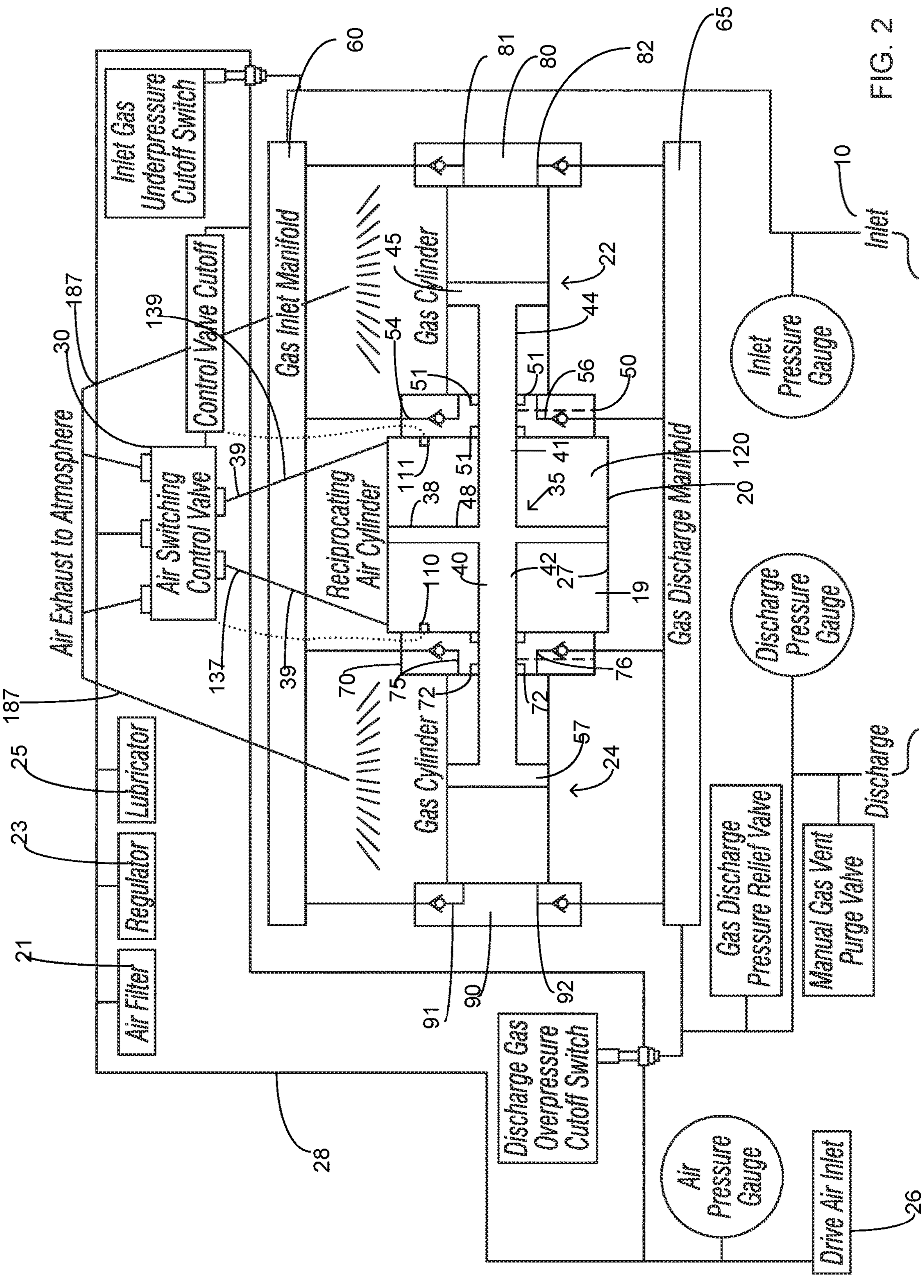
FIG. 2 is a diagrammatic view of an embodiment of the present invention.
Figure 3:
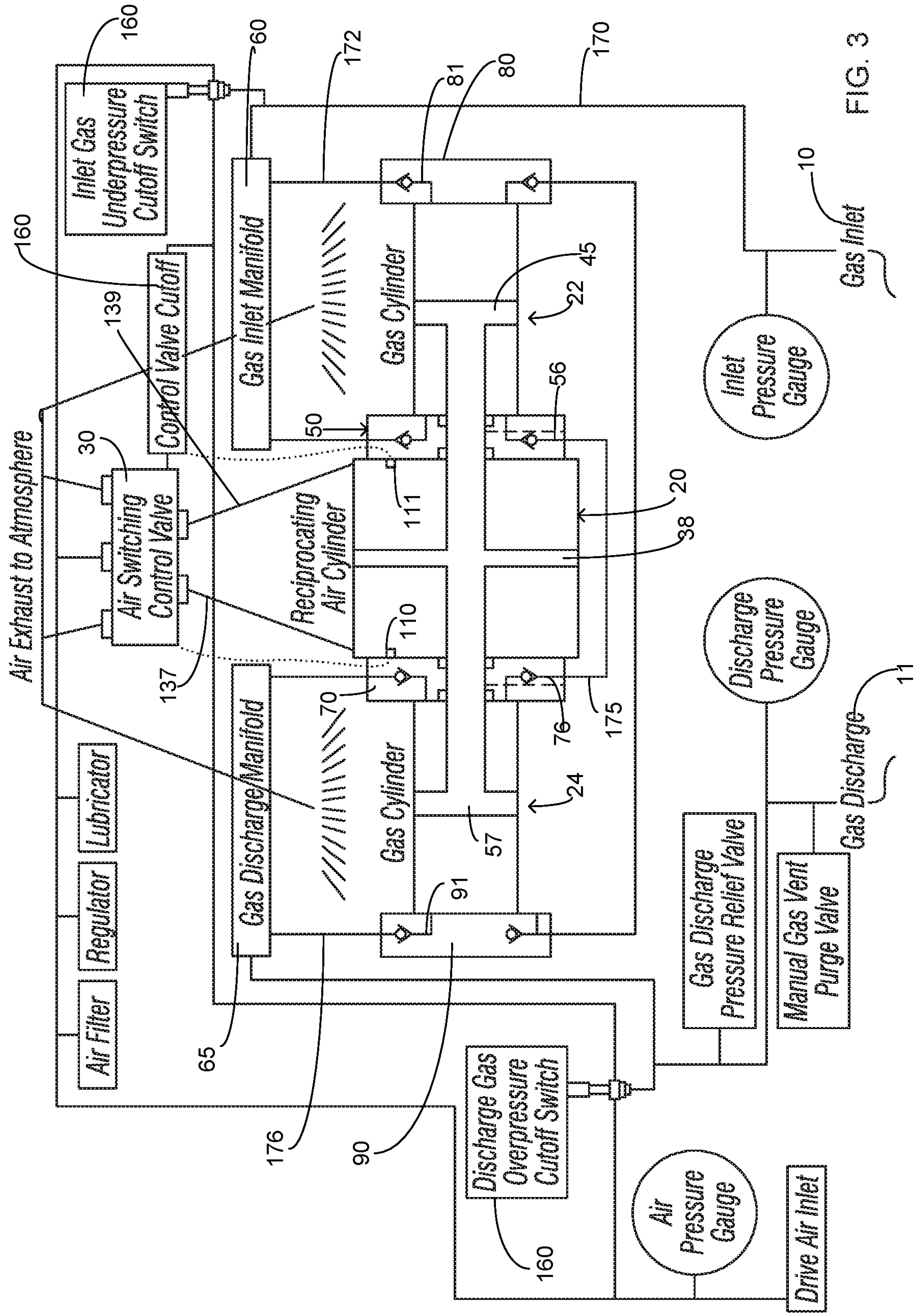
FIG. 3 is a diagrammatic view of an alternative configuration of the present invention.
Figure 4:
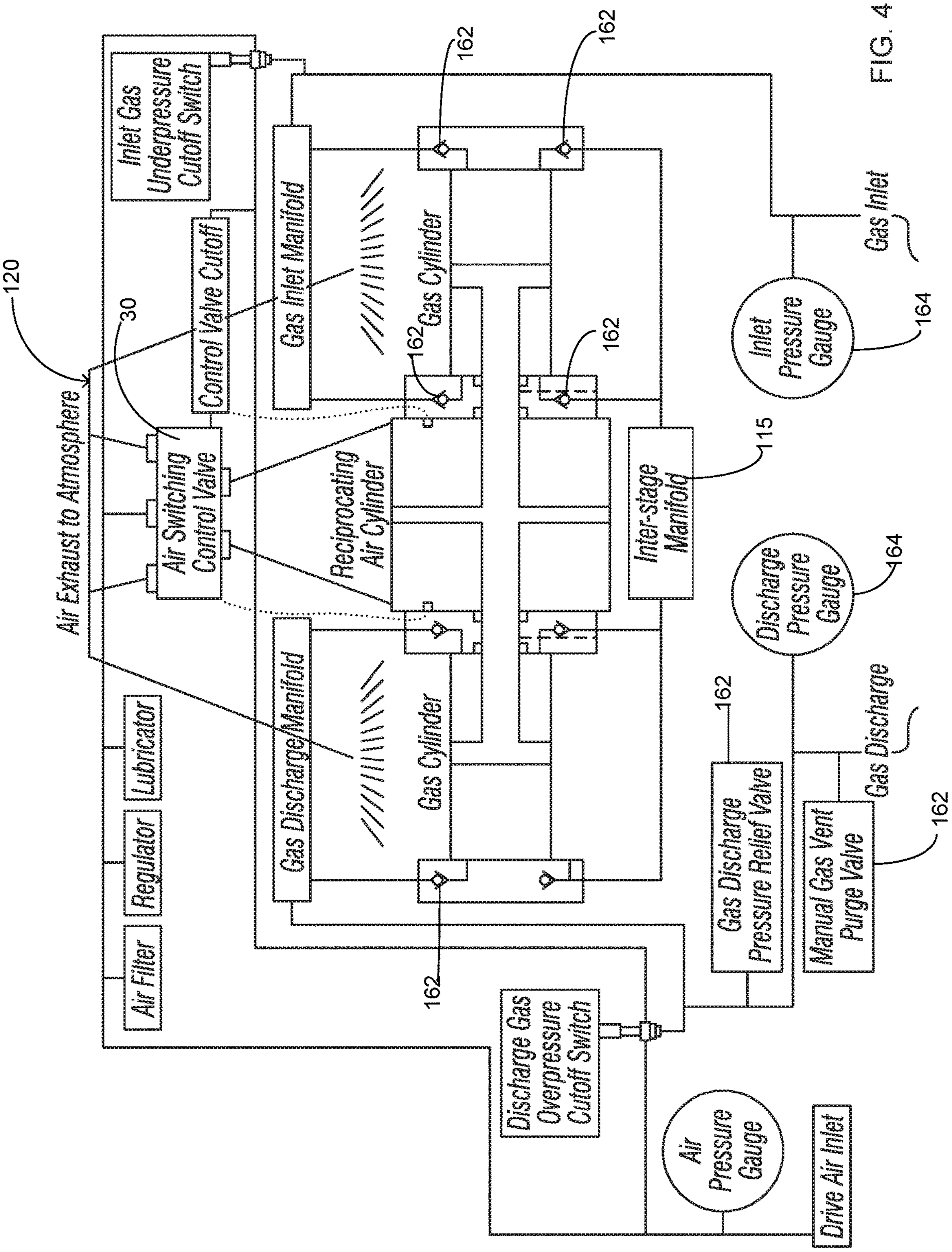
FIG. 4 is a diagrammatic view of an additional configuration of the present invention.
Figure 5:
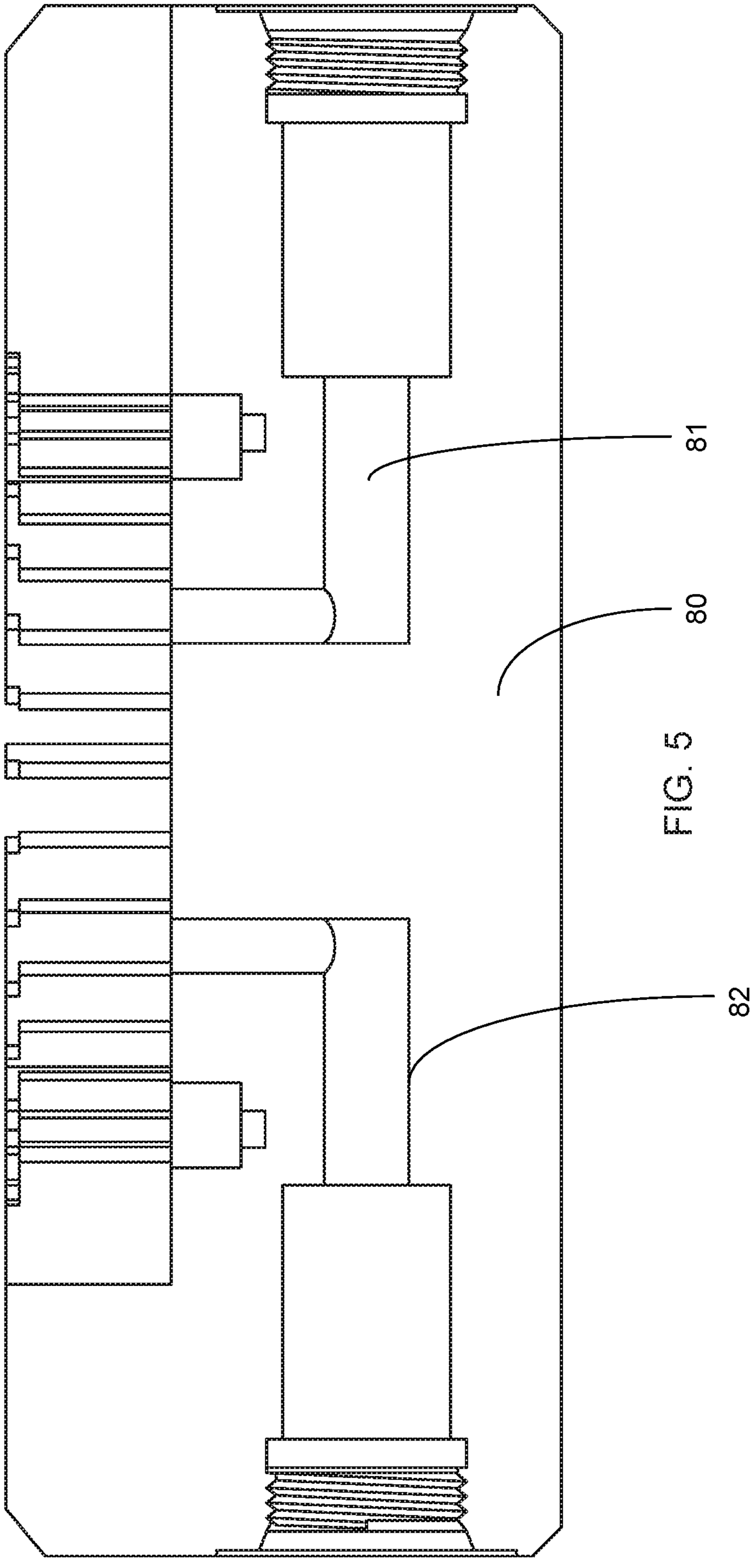
FIG. 5 is a diagrammatic view of an end view of a gas block of present invention.
Figure 6:
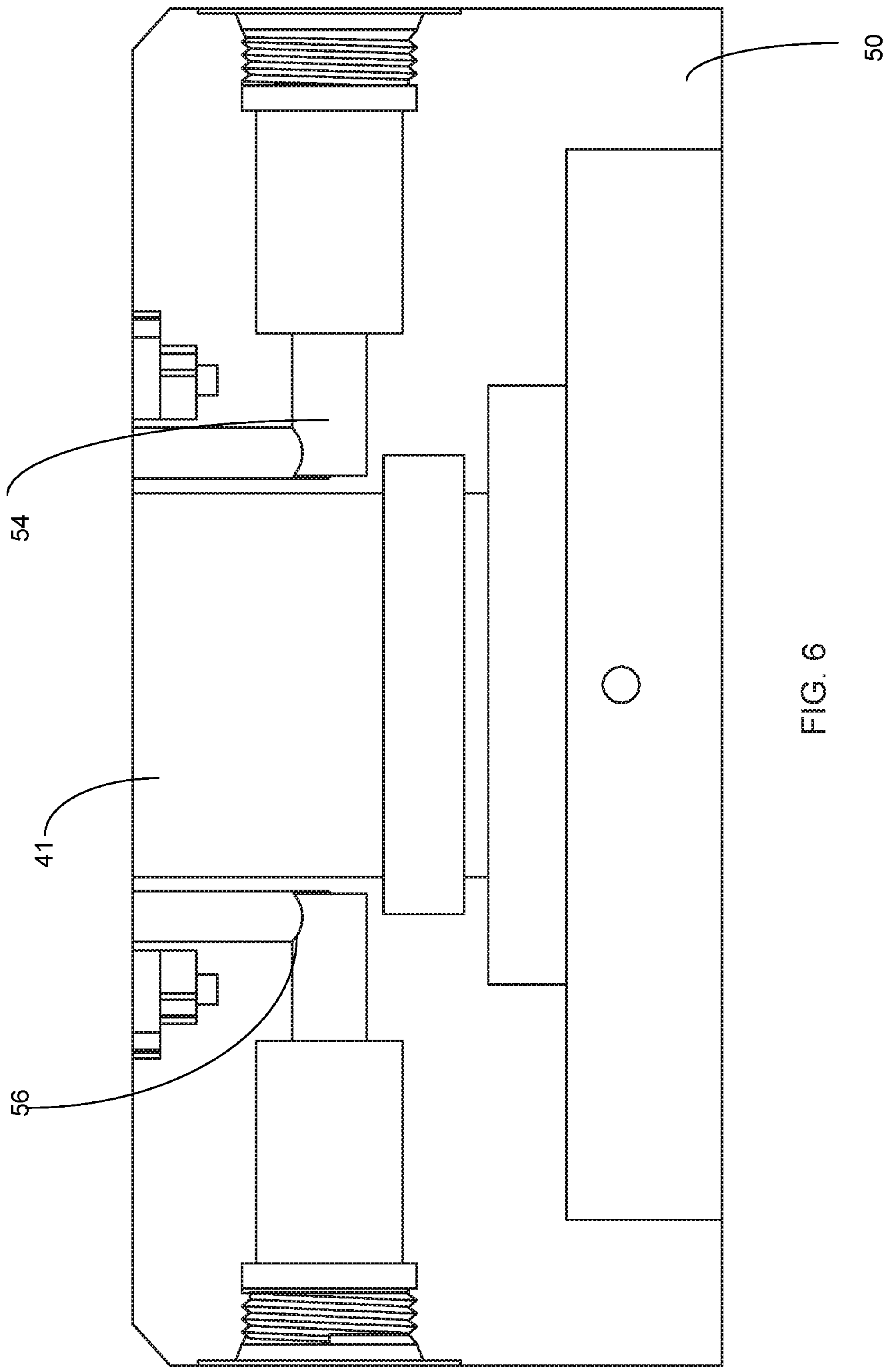
FIG. 6 is a diagrammatic view of a cylinder perspective view of the coupling block of the present invention.

The gas inlet 10 is operably coupled to the gas inlet manifold 60. The gas inlet manifold 60 is constructed of suitable durable material and has an interior volume that is configured to receive/stage a gas being introduced thereinto from the gas inlet 10. As is illustrated herein in FIG. 2 through FIG. 4, it is contemplated within the scope of the present invention that the fluid transfer and depressurization system 100 could have alternate configurations/quantities of the gas inlet manifold 60. The gas inlet manifold 60 functions to provide a sufficient volume of gas to first cylinder 22 and/or second cylinder 24 during operation of the fluid transfer and depressurization system 100. Exemplary configurations of the present invention include having a single gas inlet manifold 60 fluidly coupled to the first cylinder 22 and second cylinder 24. Alternatively, as illustrated herein in FIGS. 3 and 4 herein, a contemplated configuration of the fluid transfer and depressurization system 100 would utilize a gas inlet manifold 60 that is fluidly coupled to the first cylinder 22. Additionally, as shown in FIG. 4 herein, an inter-stage manifold 115 is further contemplated. The various configurations discussed and illustrated herein for the gas inlet manifold 60 do not serve as limitations but provide exemplary configurations which are a part of the contemplated present invention. It is contemplated within the scope of the present invention that at least one gas inlet manifold 60 is provided so as to receive and store gas from the gas inlet 10.

The gas discharge manifold 65 is operably coupled to the gas discharge port 11 and is manufactured from a suitable durable material. The gas discharge manifold 65 is constructed to have an interior volume being of sufficient size to accommodate gas from either the first cylinder 22 and/or the second cylinder 24 as the gas is discharged therefrom. The gas discharge manifold 65 provides a technique to direct the outflow of gas to the gas discharge port 11. As illustrated herein through FIG. 2 and FIG. 4 it is contemplated within the scope of the present invention that the fluid transfer and depressurization system 100 could have alternate configurations and/or quantities of gas discharge manifolds 65. In one contemplated configuration as illustrated herein in FIG. 2, the gas discharge manifold 65 is fluidly coupled to the first cylinder 22 and the second cylinder 24. An alternate configuration contemplated within the scope of the present invention as illustrated in FIG. 3 submitted as a part hereof wherein the gas discharge manifold 65 is operably coupled to the second cylinder 24. An additional configuration includes utilization of an inter-stage manifold 115 as illustrated herein in FIG. 4. It should be understood within the scope of the present invention that the fluid transfer and depressurization system 100 could deploy as few as one gas discharge manifold 65 or more than one.

Referring again to the controller 30, the controller 30 has operably coupled thereto tubing 120. Tubing 120 is manufactured from conventional material such as but not limited to metal tubing. As the drive assembly 35 is reciprocally moved by the compressed air as described herein, release of the compressed air is intrinsic to the operational cycle of the drive assembly 35. The controller 30 directs the release of air to atmosphere utilizing tubing 120. Tubing 120 is configured so as to have a portion thereof end adjacent the first cylinder 22 and another portion end proximate the second cylinder 24. The air discharged from the tubing 187 functions to provide cooling of the first cylinder 22 and second cylinder 24. It is contemplated within the scope of the present invention that the tubing 187 could be configured in alternate manners and further be configured to provide an atmospheric vent for the compressed air and not be directed so as to provide the cooling discussed herein. Further, referring to FIG. 7, the first coupling block 50 has a first side 52 facing the drive chamber 20, a second side 53 opposite the first side 52, and a first peripheral edge 58 between the first side 52 and the second side 53. The first cylinder 22 extends from the second side 53 of the first coupling block 50. As shown in FIG. 7, the first coupling block 50 has a set of cooling fins 59 on the second side 53. The first gas block 80 similarly has cooling fins 89 on a side facing the second side 53 of the first coupling block 50. The second coupling block 70 and the second gas block 90 are similarly structured.

Illustrated herein as being a part of the fluid transfer and depressurization system 100 are a plurality of conventional components that are known in the art of pressurized gas systems. By way of example but not by way of limitation, the fluid transfer and depressurization system 100 employs exemplary cutoff switches 160, exemplary valves 162 and exemplary gauges 164 that are deployed and utilized in a conventional manner so as to control flow, direct flow and measure flow as is known in the art. It is contemplated within the scope of the present invention that the fluid transfer and depressurization system 100 could employ various quantities of exemplary cutoff switches 160, exemplary valves 162 and exemplary gauges 164 as needed to provide the desired aforementioned functionality.

Now referring to FIG. 3 herein, a discussion of an exemplary flow path of gas within the fluid transfer and depressurization system 100 is as follows. Controller 30 is configured such that compressed air is being introduced into the drive chamber 20 via tube 139 and air disposed in the drive chamber 20 intermediate the drive member 38 and the second cylinder 24 is being expelled via tube 137. As compressed air flows through tube 139 the drive member 38 traverses towards the second cylinder 24. As the drive member 38 traverses towards the second cylinder 24 gas from the gas inlet 10 travels through tube 170 into gas inlet manifold 60. The gas flow continues through tube 172 into the interior volume of the first cylinder 22 in particular the portion intermediate the first gas block 80 and piston 45. Gas disposed on the opposing side of the piston 45 in the first cylinder 22 egresses therefrom as the piston 45 is traveling in conjunction with the drive member 38. Gas intermediate the piston 45 and the first coupling block 50 is directed through lower passage 56 into tubing 175. The gas flows from tubing 175 to the second passage 76 of the second coupling block 70 and is introduced into the second cylinder 24 wherein the gas will be disposed intermediate the piston 57 and the second coupling block 70. Simultaneously, gas disposed intermediate piston 57 and second gas block 90 propagates passage 91 outward towards the gas discharge manifold 65. The gas continues outward from the gas discharge manifold 65 via tube 176 where the gas exits the fluid transfer and depressurization system 100 via the gas discharge port 11. The immediately aforementioned flow path description for the fluid transfer and depressurization system 100 serves to demonstrate a flow path for a single movement of the drive member 38. During the reciprocal movement of the drive member 38 it should be understood by those skilled in the art that a similar but opposing flow path occurs. It is contemplated within the scope of the present invention that the flow path of the fluid transfer and depressurization system 100 will vary based upon the configurations illustrated herein and contemplated as a part of the present invention. Irrespective of the particular configuration, as the drive member 38 is reciprocally moved within the drive chamber 20 the introduction of gas into either the first cylinder 22 or the second cylinder 24 occurs and simultaneous expulsion of gas from the opposing cylinder occurs and is discharged outward from the fluid transfer and depressurization system 100 via the gas discharge port 11. The fluid transfer and depressurization system 100 is configured so as to operably couple to a first location having a pressurized gas disposed therein and transfer the gas to a second location wherein during operation the fluid transfer and depressurization system 100 depressurizes the first location without the loss of gas to the atmosphere. It is further contemplated within the scope of the present invention that the fluid transfer and depressurization system 100 could move a fluid at atmospheric pressure from a first location to a second location wherein the second location is also at atmospheric pressure.

While the fluid transfer and depressurization system 100 has been discussed herein for movement of a pressurized gas from a first location to a second location, it is contemplated within the scope of the present invention that the fluid transfer and depressurization system 100 could be utilized to move various types of fluids such as but not limited to liquids. Additionally, while the fluid transfer and depressurization system 100 has been illustrated and discussed herein as having a first cylinder 22 and a second cylinder 24 opposedly located with respect to the drive chamber 20, it is further contemplated within the scope of the present invention that more than two cylinders could be utilized. By way of example but not limitation, four or more cylinders increasing by paired numbers could be utilized in the fluid transfer and depressurization system 100 and achieve the desired functionality as described herein. While not suitable for all operational environments of the fluid transfer and depressurization system 100, it is further contemplated within the scope of the present invention that the operational technique of utilizing compressed air could be replaced with alternate suitable techniques such as but not limited to electric motors, wherein an electric motor would reciprocally move the drive assembly 35 as described herein. It should be further understood by those skilled in the art that the fluid transfer and depressurization system 100 while illustrated and discussed herein as being utilized in a standalone configuration could further be deployed in parallel or series configurations.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A fluid transfer apparatus comprising:

a drive chamber having a first end and a second end opposite the first end;

a first block on the first end of the drive chamber;

a second block on the second end of the drive chamber;

a first cylinder extending outward from the first block;

a second cylinder extending outward from the second block, the first and second cylinders fluidly coupled between a gas inlet and a gas outlet;

a drive assembly including:

a drive member in the drive chamber, the drive member dividing the drive chamber into a first chamber portion and a second chamber portion;

a rod coupled to and extending from the drive member, a first portion of the rod extending into the first cylinder, a second portion of the rod extending into the second cylinder;

a first piston coupled to the first portion of the rod and disposed in the first cylinder; and a second piston coupled to the second portion of the rod and disposed in the second cylinder;

a switching valve to alternately supply compressed air into the first chamber portion and the second chamber portion to drive the drive assembly in a reciprocating motion; and a first fluid line to vent air from the first chamber portion when the compressed air is being supplied into the second chamber portion, the first fluid line positioned to direct at least a portion of the air vented from the first chamber portion toward and onto an outside surface of the first block to cool the fluid transfer apparatus.

2. The fluid transfer apparatus of claim 1, further including a third block coupled to a distal end of the first cylinder, the first fluid line positioned to direct at least a portion of the air vented from the first chamber portion toward the third block.

3. The fluid transfer apparatus of claim 1, further including a second fluid line to vent air from the second chamber portion when the compressed air is being supplied into the first chamber portion, the second fluid line positioned to direct at least a portion of the air vented from the second chamber portion toward the second block.

4. The fluid transfer apparatus of claim 3, further including:

a third block coupled to a distal end of the first cylinder, the first fluid line positioned to direct at least a portion of the air vented from the first chamber portion toward the third block; and a fourth block coupled to a distal end of the second cylinder, the second fluid line positioned to direct at least a portion of the air vented from the second chamber portion toward the fourth block.

5. The fluid transfer apparatus of claim 3, wherein the first fluid line and the second fluid line are fluidly coupled.

6. The fluid transfer apparatus of claim 1, wherein the first fluid line is positioned to direct at least a portion of the air vented from the first chamber portion toward an outer surface of the first cylinder.

7. The fluid transfer apparatus of claim 1, further including a second fluid line fluidly coupled between the switching valve and the first chamber portion, the switching valve to switch between (1) a first state in which the compressed air is supplied through the second fluid line and into the first chamber portion and (2) a second state in which the second fluid line and the first fluid line are fluidly coupled to vent the air from the first chamber portion.

8. The fluid transfer apparatus of claim 7, further including:

a third fluid line to vent air from the second chamber portion when the compressed air is being supplied into the first chamber portion; and a fourth fluid line fluidly coupled between the switching valve and the second chamber portion, the switching valve to switch between (1) the first state in which the fourth fluid line and the third fluid line are fluidly coupled to vent the air from the second chamber portion, and (2) the second state in which the compressed air is supplied through the fourth fluid line and into the second chamber portion.

9. The fluid transfer apparatus of claim 1, wherein the first block has a first inlet passage to fluidly couple an interior of the first cylinder and the gas inlet and a first outlet passage to fluidly couple the interior of the first cylinder and the gas outlet.

10. The fluid transfer apparatus of claim 9, wherein the second block has a second inlet passage to fluidly couple an interior of the second cylinder and the gas inlet and a second outlet passage to fluidly couple the interior of the second cylinder and the gas outlet.

11. The fluid transfer apparatus of claim 1, wherein the first block has a first side facing the drive chamber and a second side opposite the first side, the second side of the first block having a plurality of cooling fins.

12. A fluid transfer apparatus comprising:

a drive chamber having a first end and a second end opposite the first end;

a first cylinder;

a second cylinder, the first and second cylinders fluidly coupled between a gas inlet and a gas outlet;

a drive assembly moveable in a reciprocal manner between a first movement in a first direction and a second movement in a second direction opposite the first direction, the drive assembly including:

a drive member in the drive chamber;

a rod coupled to and extending from the drive member, a first portion of the rod extending into the first cylinder, a second portion of the rod extending into the second cylinder;

a first piston coupled to the first portion of the rod and disposed in the first cylinder; and a second piston coupled to the second portion of the rod and disposed in the second cylinder;

a first block coupled between the first end of the drive chamber and the first cylinder, the first block having a first side facing the drive chamber, a second side opposite the first side, and a first peripheral edge between the first side and the second side, the first cylinder extending from the second side of the first block, the first block having a first set of cooling fins on the second side; and a second block coupled to a distal end of the first cylinder, the second block having a third side facing toward the second side of the first block, a fourth side opposite the third side, and a second peripheral edge between the third side and the fourth side, the second block having a second set of cooling fins on the third side.

13. The fluid transfer apparatus of claim 12, wherein the first set of cooling fins extend to the first peripheral edge of the first block.

14. The fluid transfer apparatus of claim 12, further including a third block coupled between the second end of the drive chamber and the second cylinder, the third block having a third set of cooling fins.

15. The fluid transfer apparatus of claim 14, further including:

a fourth block coupled to a distal end of the second cylinder, the fourth block having a fourth set of cooling fins.

16. The fluid transfer apparatus of claim 12, wherein the first block has a first inlet passage to fluidly couple an interior of the first cylinder and the gas inlet and a first outlet passage to fluidly couple the interior of the first cylinder and the gas outlet.

17. The fluid transfer apparatus of claim 12, a switch on the first side of the first block facing the drive chamber, the switch to be engaged by the drive member.

18. The fluid transfer apparatus of claim 12, wherein the first block is constructed of metal.

19. The fluid apparatus of claim 12, wherein the first set of cooling fins are distributed on the second side of the first block around the first cylinder, and wherein the second set of cooling fins are distributed on the third side of the second block around the first cylinder.

20. The fluid apparatus of claim 12, further including a fluid line to vent air from a portion of the drive chamber, the fluid line positioned to direct at least a portion of the air toward the second side of the first block.

* * * * *